United States Patent
Lin et al.

(10) Patent No.: US 12,242,838 B2
(45) Date of Patent: Mar. 4, 2025

(54) SERVER MANAGEMENT APPARATUS AND SERVER MANAGEMENT METHOD

(71) Applicant: RAKUTEN MOBILE, INC., Tokyo (JP)

(72) Inventors: Yu-Chun Lin, Tokyo (JP); Masachika Hamabe, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/767,150

(22) PCT Filed: Jun. 30, 2021

(86) PCT No.: PCT/JP2021/024735
§ 371 (c)(1),
(2) Date: Jan. 5, 2023

(87) PCT Pub. No.: WO2023/276039
PCT Pub. Date: Jan. 5, 2023

(65) Prior Publication Data
US 2024/0103824 A1  Mar. 28, 2024

(51) Int. Cl.
*G06F 8/65* (2018.01)
*G06F 16/16* (2019.01)

(52) U.S. Cl.
CPC ............. *G06F 8/65* (2013.01); *G06F 16/16* (2019.01)

(58) Field of Classification Search
CPC .................................. G06F 8/65; G06F 16/16

USPC ........................................................ 717/168
See application file for complete search history.

(56) References Cited

U.S. PATENT DOCUMENTS

| | | | |
|---|---|---|---|
| 7,881,745 B1* | 2/2011 | Rao | H04W 24/02 709/203 |
| 2011/0078519 A1* | 3/2011 | Yordanov | G06F 11/0766 714/48 |
| 2016/0364226 A1 | 12/2016 | Takano et al. | |
| 2018/0131579 A1* | 5/2018 | Jacobs | H04L 41/022 |

FOREIGN PATENT DOCUMENTS

WO   2015/146355 A1   10/2015

* cited by examiner

*Primary Examiner* — Yair Leibovich
(74) *Attorney, Agent, or Firm* — Sughrue Mion, PLLC

(57) ABSTRACT

Disclosed herein is a server management apparatus, comprising: a server information acquisition unit configured to acquire, from a plurality of servers respectively, server information on a server and hardware component information on hardware components included in the server, using an identifier of a control board of the server as a key; an analysis unit configured to analyze the server information and the hardware component information, and acquire information indicating whether or not firmware of any of the server and the hardware components needs to be updated; and a structured file generation unit configured to generate a structured file that hierarchically stores, in a readable format, the server information and the hardware component information, the structured file including a header describing the information indicating whether or not the firmware of any of the server and the hardware components needs to be updated.

13 Claims, 11 Drawing Sheets

FIG. 8

SERVER MANAGEMENT APPARATUS AND SERVER MANAGEMENT METHOD

CROSS REFERENCE TO RELATED APPLICATIONS

This application is a National Stage of International Application No. PCT/JP2021/024735 filed Jun. 30, 2021.

TECHNICAL FIELD

The present invention relates to a server management apparatus, a server management method and a program thereof, and more particularly, to a technique for managing servers deployed in a large number of accommodating stations that accommodate base stations in a mobile network.

BACKGROUND ART

Mobile networks are large-scale networks and socially important infrastructures that require high reliability and high availability. Therefore, efficiency and automation are essential in the construction, maintenance, and operation of mobile networks.

A user terminal (i.e., User Equipment: hereinafter referred to as "UE") such as a wireless terminal that uses a mobile network connects wirelessly to an accommodating station that accommodates base stations. The accommodating station relays the wireless connection from the UE and connects the UE to a core network via a backhaul network.

The network of such accommodating station has a function of the Distributed Unit (DU), which is a radio signal processing unit, and the Central Unit (CU), which is a data processing unit, in order to accommodate wireless base stations of the 4th generation mobile communication system (hereinafter referred to as "4G") and/or 5th generation mobile communication system (hereinafter referred to as "5G"), home networks, or enterprise network, and connect to the core network.

In recent years, the functions of the DUs and the CUs in those accommodating stations are also often constructed on a network virtualization infrastructure in which network functions are realized by software on general-purpose servers or cloud.

Patent Literature 1 (International Publication of PCT International Patent Application No. WO2015/146355 A) discloses a system that manages each of the virtualized resources, including physical servers on which virtual servers running communication services are generated, and that automates the updating of applications for the communication services.

More particularly, the update management system disclosed in Patent Literature 1 includes: a virtualized resource management node that manages each of the virtualized resources and generates a new version virtual server based on an instruction to generate the new version virtual server; a service monitoring means that monitors the communication service executed by the virtual server; and a virtualized communication function management node that instructs the virtualized resource management node to generate the new version virtual server, generates old/new correspondence data representing the correspondence between the new version virtual server and the old version virtual server, and notifies the service monitoring means that the new version virtual server is to be activated based on the old/new correspondence data. The virtualized communication function management node instructs the virtualization resource management node to switch the network from the old version virtual server to the new version virtual server, and the virtualized resource management node executes the network switch to the new version virtual server based on the network switching instruction.

LISTING OF REFERENCES

Non-Patent Literature

PATENT LITERATURE 1: International Publication of PCT International Patent Application No. WO2015/146355 A Meanwhile, those accommodating stations are geographically distributed in many locations. In order to construct a network virtualization infrastructure for each of those distributed accommodating stations, it is required to install an Operating System (OS) and virtualization software to implement the virtualization infrastructure on the servers deployed in each of accommodating stations.

Here, prior to the OS installation, it is required to confirm that the servers meet all the prerequisites for installing the OS and virtualization software. In other words, the hardware of the bare metal servers, which are servers before the OS is installed, must be diagnosed, and the OS and virtualization software must be installed solely on the bare metal servers that have no problems according to the diagnosis results. In addition, the firmware of the bare metal servers must be updated as appropriate, and the OS and virtualization software must be installed solely on the bare metal servers with the appropriately updated firmware.

SUMMARY OF THE INVENTION

Problems to be Solved by the Invention

However, the vendors and models of bare metal servers deployed in respective accommodating stations differ from one another, and a single bare metal server may include a number of hardware components, such as a Network Interface Card (NIC), a Solid State Drive (SSD), a Redundant Array of Inexpensive Disks (RAID), and the like.

For this reason, in order to diagnose a large number of bare metal servers and hardware components thereof deployed in a large number of accommodating stations, respectively, it is necessary to remotely input commands from the command line for each of bare metal servers and for each of hardware components of each bare metal server, which requires a great deal of labor and is inefficient. As a result, it makes it difficult to expeditiously construct the network virtualization infrastructure for a large number of accommodating stations.

The present invention has been made in order to solve the above mentioned problems and an object thereof is to provide a server management apparatus, a server management method, and a program thereof capable of updating firmware of servers more expeditiously with higher accuracy in a large-scale network constructed on a network virtualization infrastructure.

Solution to Problems

In order to solve the above mentioned problems, according to one aspect of the present invention, there is provided A server management apparatus, comprising: a server information acquisition unit configured to acquire, from a plurality of servers respectively, server information on a server and hardware component information on hardware components included in the server, using an identifier of a control board of the server as a key; an analysis unit configured to analyze the server information and the hardware component information acquired by the server information acquisition unit, and acquire information indicating whether or not firmware of any of the server and the hardware components needs to be updated; and a structured file generation unit configured to generate a structured file that hierarchically stores, in a readable format, the server information and the hardware component information acquired by the server information acquisition unit, the structured file including a header describing the information indicating whether or not the firmware of any of the server and the hardware components needs to be updated acquired by the analysis unit.

The structured file generation unit may describe the header as a file name of the structured file.

The structured file generation unit may set the identifier of the control board to the structured file as a key of the structured file.

The structured file generation unit may describe at least a part of the server information in the header of the structured file, and describe at least a part of the hardware component information in a body of the structured file.

The structured file generation unit may describe, in the header of the structured file, a timestamp when the server information and the hardware component information are acquired by the server information acquisition unit.

The identifier of the control board used by the server information acquisition unit as the key may be an IP address of the control board.

The server management apparatus may further comprise: a firmware update instructing unit configured to extract a server of which firmware needs to be updated based on the information indicating whether or not the firmware of any of the server and the hardware components needs to be updated, and instruct to update the firmware to the extracted server.

The firmware update instructing unit may acquire a server status flag indicating whether or not any of the server and the hardware components has an abnormality, and instruct to update the firmware to the server of which server status flag indicates no abnormality.

The server management apparatus may further comprise: an automatic diagnosis unit configured to cause the server information acquisition unit to periodically acquire the server information and the hardware component information for all servers connected to the server management apparatus, cause the analysis unit to extract a server of which server status flag indicates abnormality from among the all servers, and add information indicating which hardware component is a source of the abnormality to an analysis result of the extracted server to externally output the analysis result.

The server management apparatus may further comprise: a structured file storage unit configured to store the structured file generated by the structured file generation unit.

The server management apparatus may further comprise: a display controller unit configured to sort, in response to an input request, one or plurality of columns specified by the input request from among a plurality of columns of the header of the structured file, and cause a display device to output the sorted columns.

According to another aspect of the present invention, there is provided a server management method performed by a server management apparatus, comprising steps of: acquiring, from a plurality of servers respectively, server information on a server and hardware component information on hardware components included in the server, using an identifier of a control board of the server as a key; analyzing the server information and the hardware component information, and generating acquire information indicating whether or not firmware of any of the server and the hardware components needs to be updated; and generating a structured file that hierarchically stores, in a readable format, the server information and the hardware component information, the structured file including a header describing the information indicating whether or not the firmware of any of the server and the hardware components needs to be updated.

According to yet another aspect of the present invention, there is provided a server management program for causing a computer to execute server management processing, the program causing the computer to execute processing comprising: a server information acquisition process for acquiring, from a plurality of servers respectively, server information on a server and hardware component information on hardware components included in the server, using an identifier of a control board of the server as a key; an analysis process for analyzing the server information and the hardware component information acquired by the server information acquisition process, and acquiring information indicating whether or not firmware of any of the server and the hardware components needs to be updated; and a structured file generation process for generating a structured file that hierarchically stores, in a readable format, the server information and the hardware component information acquired by the server information acquisition process, the structured file including a header describing the information indicating whether or not the firmware of any of the server and the hardware components needs to be updated acquired by the analysis process.

Advantageous Effect of the Invention

According to the present invention, it makes it possible to update firmware of servers more expeditiously with higher accuracy in a large scale network constituted with a network virtualization infrastructure.

The above mentioned and other not explicitly mentioned objects, aspects and advantages of the present invention will become apparent to those skilled in the art from the following embodiments (detailed description) of the invention by referring to the accompanying drawings and the appended claims.

BRIEF DESCRIPTION OF DRAWINGS

FIG. 8 is a diagram illustrating exemplary information of the bare metal server and hardware components described in a body of the structured file.

DESCRIPTION OF EMBODIMENTS

Figure 1:
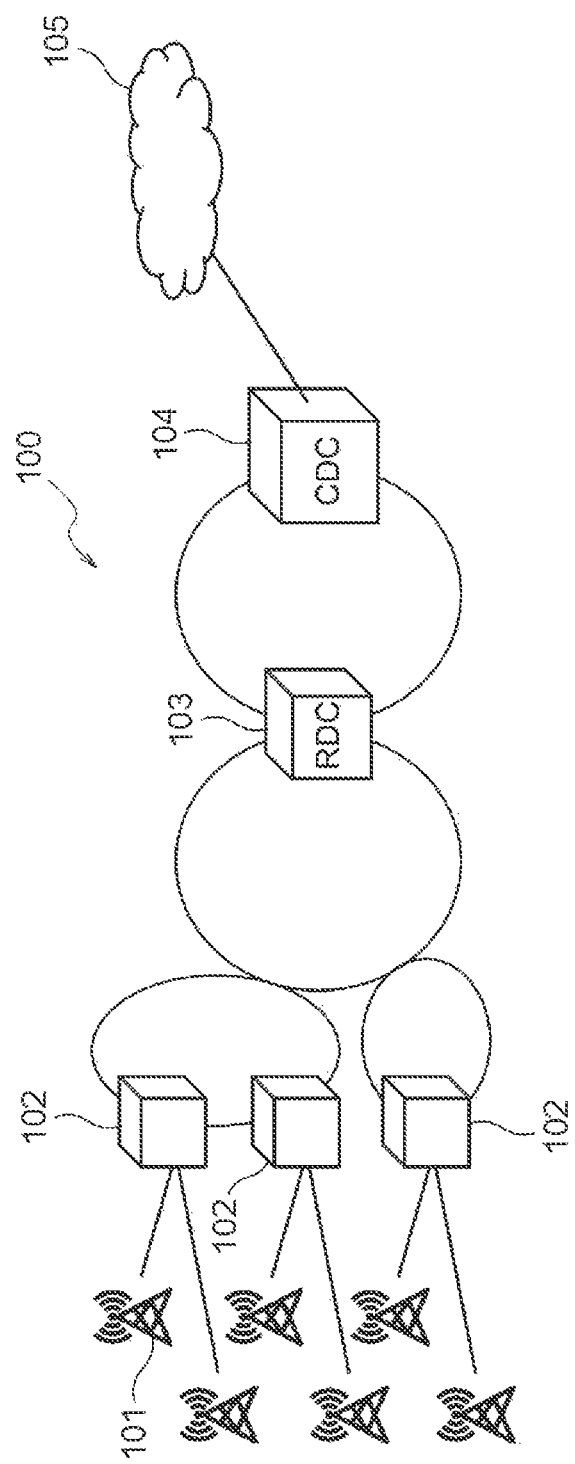
FIG. 1 is a conceptual diagram illustrating an exemplary network configuration of a mobile network system including a server management apparatus according to embodiments of the present invention.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

First Embodiment

Hereinafter, a non-limiting example will be described in which a server management apparatus according to the present embodiment is implemented in a central server apparatus, which may be located in a central data center or the like that constitutes a core network, connects to respective nodes that constitute a network virtualization infrastructure to collect information from bare metal servers deployed in a large number of accommodating stations distributed in a mobile network, diagnoses the bare metal servers by analyzing the collected information to generate a structured file in a readable format that includes information on the bare metal server and a server status flag indicating whether or not any of the bare metal server and the hardware components included in the bare metal server has abnormality, and instructs the bare metal server that has no abnormality to install an OS and virtualization software by referring to the structured file.

However, the present embodiment is not limited thereto. The server management apparatus according to the present embodiment may be implemented in any server apparatus that is deployed elsewhere than the central data center and constitutes the backhaul network relaying a Radio Access Network (RAN) to the core network or the core network itself.

The server management apparatus according to the present embodiment may also be implemented in any of the nodes that constitutes the network virtualization infrastructure.

According to the present embodiment, a bare metal server refers to a general-purpose server apparatus that is deployed in the accommodating station, or the like, in the mobile network and is capable of constituting the network virtualization infrastructure, but before the OS is installed.

<Network Configuration of Mobile Network System>

FIG. 1 is a conceptual diagram illustrating an exemplary network configuration of a mobile network system including a server management apparatus according to the present embodiment.

The mobile network 100 shown in FIG. 1 includes a base station 101, a plurality of accommodating stations 102, a Regional Data Center (RDC) 103, and a Central Data Center (CDC) 104.

The mobile network 100 according to the present embodiment may be a virtualized network constructed on a virtualization infrastructure. In the mobile network 100, the physical network is virtualized, and end-to-end network functions across the RAN, the backhaul network, and the core network are realized on general-purpose servers or cloud using virtualization software.

The mobile network 100 may be a 4G network or a 5G network, or any other generation of mobile communication system, as long as the mobile network can be implemented in the virtualization infrastructure.

Referring to FIG. 1, the base station 101 includes an antenna, a Remote Radio Head (RRH), a Radio Interface Unit (RIU), which is a line termination device, and the like, and transmits and receives radio signals to and from the UE (not shown) via the antenna of the base station 101.

The base station 101 is an edge node that constitutes the RAN of the mobile network 100. The base station 101 receives an attach request from the UE, and connects the UE to the core network via the fronthaul network and the backhaul network to relay data transmission and voice calls between the UE and the Internet 105.

The UE may be a mobile terminal such as a smartphone, a cell phone, a tablet, or a Personal Computer (PC), a mobile device such as a vehicle, or a terminal with built-in equipment such as a sensor, and its type is not limited thereto, as long as the UE is capable of mobile communication via the base station 101.

The accommodating station 102 is an edge data center that accommodates a plurality of base stations 101, home networks, or enterprise networks via the fronthaul network constituted with fiber optic cables, or the like.

In order to relay the radio access request to the core network, the accommodating station 102 bears functions of a Distributed Unit (DU), which is a radio signal processing unit, and a Central Unit (CU), which is a data processing unit. Those DU and CU may be a virtualized vDU and a virtualized vCU, respectively.

The RDC 103 accommodates a plurality of accommodating stations 102 distributed in the target area via the backhaul network constituted with optical fiber cables, or the like, and bears functions of a firewall and a Network Address Translation (NAT), which is an IP address translation function.

The CDC 104 accommodates one or a plurality of RDCs 103 via the backhaul network, and bears functions of the core network such as an Evolved Packet Core (EPC) and an IP Multimedia Subsystem (IMS).

The core network is a high-capacity backbone network that is used by the mobile network 100 as the central role of communications, and connects between line concentrators, hub stations, and operators.

It should be noted that the number of base stations 101, accommodating stations 102, RDC 103, and CDC 104 are not limited to the number shown in FIG. 1. For example, although FIG. 1 shows one RDC 103 and one CDC 104, respectively, there may be a plurality of RDCs 103 and CDCs 104, respectively.

Figure 2:
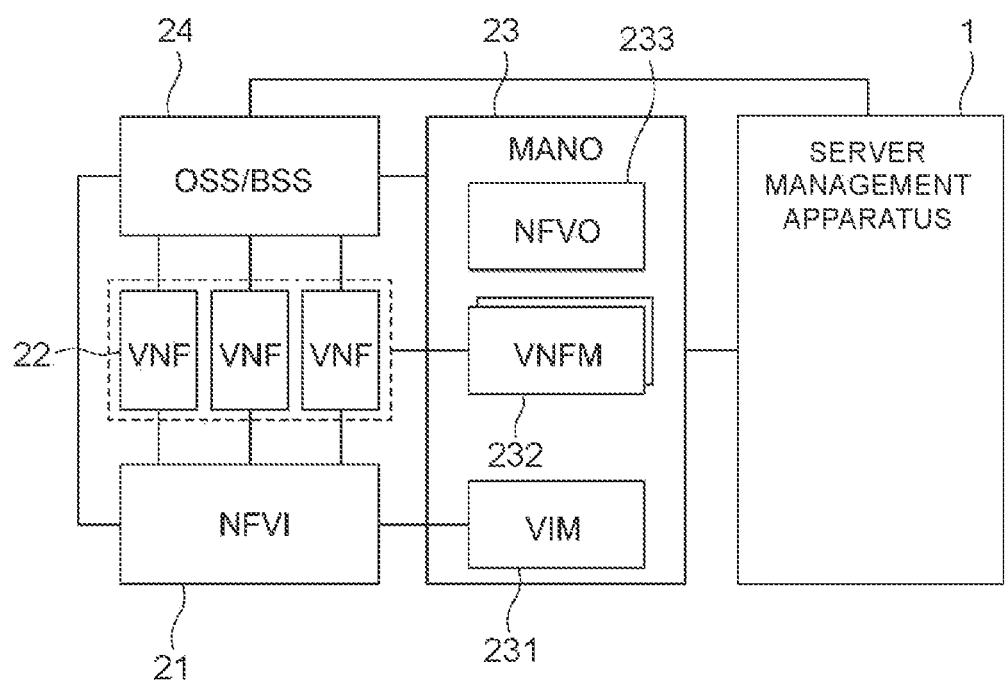
FIG. 2 is a block diagram illustrating an exemplary relationship between a virtualization infrastructure of the mobile network system in FIG. 1 and the server management apparatus according to the present embodiments.

FIG. 2 is a block diagram illustrating an exemplary relationship between the virtualization infrastructure of the mobile network system in FIG. 1 and the server management apparatus according to the present embodiment.

Referring to FIG. 2, the Network Function Virtualization Infrastructure (NFVI) 21 is an infrastructure for network virtualization and includes physical resources, virtualization layers, and virtualized resources. The physical resources include hardware resources such as computing, storage, and transmission resources.

The virtualization layer is constituted with a hypervisor or the like, which virtualizes the physical resources and provides the virtualized physical resources to the Virtualized Network Function (VNF) 22. The virtualized resources are the virtualized resources that are provided to the VNF 22.

In other words, the NFVI 21 is an infrastructure that allows the hardware resources, which are physical resources that realize computing, storage, transmission, and the like, to be handled flexibly as virtualized hardware resources virtualized by the virtualization layer such as the hypervisor.

A plurality of general-purpose servers constituting the NFVI 21 in FIG. 2 may be deployed in each of the accommodating station 102, the RDC 103, and the CDC 104. The number, arranging positions, wirings, and the like, of the general-purpose servers to be deployed in each of the accommodating station 102, the RDC 103, and the CDC 104 are predetermined based on the type of the accommodating station and the data center. The plurality of general-purpose servers deployed in the same station are connected to each other in a communicable manner.

The VNF 22 is a set of virtualized network functions that are deployed on the physical resources and the virtualized resources and correspond to respective applications running on a virtual machine (VM) on the general-purpose servers, respectively, so as to realize the network functions by software. Each of the VNFs 22 may have an Element Manager (EM), which is a management function of the VM.

A Management and Orchestration (MANO) 23 has a management function and an orchestration function of the virtualized environment constituted with the NFVI 21 and the VNFs 22. The MANO 23 includes a Virtualized Infrastructure Manager (VIM) 231, a VNF Manager (VNFM) 232, and a NVF Orchestrator (NVFO) 233.

The VIM 231 performs operation and management of the physical resources and the virtualized resources used by the VNF 22.

The VNFM 232 allocates a set of network functions of each of the VNFs 22 on physical and virtualized resources and performs the lifecycle management of each of the VNFs 22. The set of network functions to be deployed include communication functions, service application functions, and data transfer protocols necessary to provide respective services. It should be noted that the VNFM 232 may be a dedicated VNFM that is dedicated to each of the VNFs 22, or otherwise may be a general-purpose VNFM that is provided for two or more VNFs 22.

The NFVO 233 performs the orchestration of respective resources of the NFVI 21, the deployment of the set of network functions of the VNFs 22, and integrated operation and management of the entire system. This NFVO 233 performs the processing corresponding to instructions issued from an Operation Support System (OSS)/Business Support System (BSS) 24.

The OSS/BSS 24 is a system that monitors and manages service instances corresponding to applications provided to end users, which are the uppermost layer of the virtualized network. The OSS is, for example, the system required to constitute and operate respective service instances. The BSS is a system required for billing, customer information management, and the like.

The server management apparatus 1 is connected to the NFVI 21, the OSS/BSS 24, and the MANO 23 in a communicable manner, and performs the bare metal server diagnosis processing according to the present embodiment.

It should be noted that, although FIG. 2 illustrates an example in which the server management apparatus 1 is implemented in a separate node, independent from the nodes of the virtualization infrastructure, the present embodiment is not limited thereto. For example, the server management apparatus 1 may be implemented as a part of MANO 23, or alternatively implemented as a part of an OSS/BSS 24.

<Functional Configuration of Server Management Apparatus>

Figure 3:
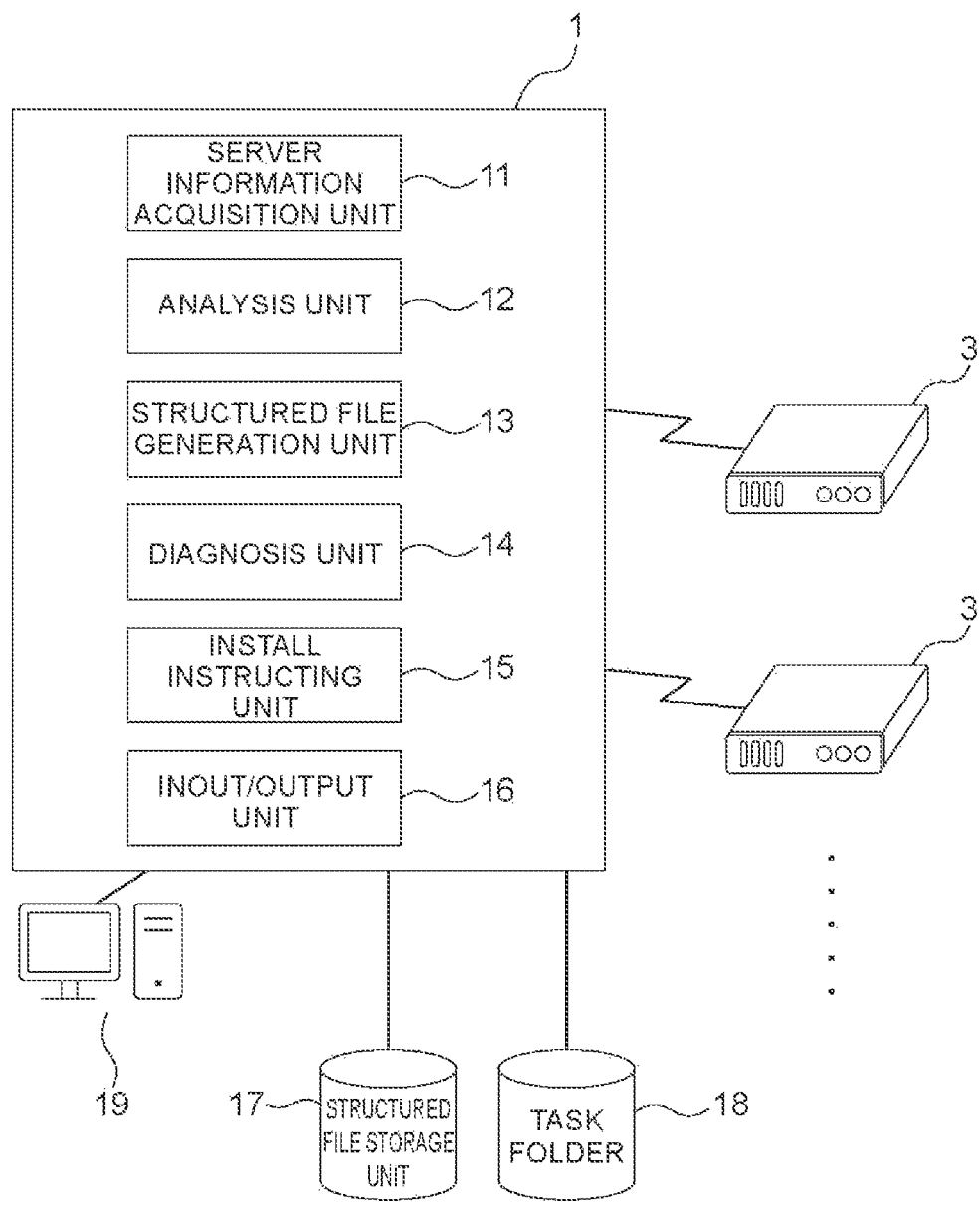
FIG. 3 is a block diagram illustrating an exemplary functional configuration of the server management apparatus according to a first embodiment.

FIG. 3 is a block diagram illustrating an exemplary functional configuration of the server management apparatus according to the first embodiment.

Among the functional modules of the slicing controller apparatus 1 shown in FIG. 3, as for the functions that are implemented by software, those functions may be implemented by storing the program to provide the functions of each functional module in a ROM or other memory, and the allowing a CPU to read the programs into a RAM to execute the programs. As for the functions that are implemented in hardware, for example, a dedicated circuit may be automatically generated on a Field Programmable Gate Array (FPGA) from the programs to provide the function of respective function modules by using a predetermined compiler. Alternatively, it is also possible to form a Gate Array circuit in the same way as an FPGA and implement it by hardware. Yet alternatively, those functions may be implemented an Application Specific Integrated Circuit (ASIC). The configuration of the functional blocks shown in FIG. 3 is no more than an example, and multiple functional blocks may constitute a single functional block, or any of the functional blocks may be divided into blocks that perform multiple functions.

Referring to FIG. 3, the server management apparatus 1 includes a server information acquisition unit 11, an analysis unit 12, a structured file generation unit 13, a diagnosis unit 14, an installation instructing unit 15, an input/output unit 16, a structured file storage unit 17, and a task folder 18.

The server information acquisition unit 11 acquires, from a large number of bare metal servers 3 deployed in a plurality of accommodating stations 102, respectively, information on each of the bare metal servers and the hardware components constituting the bare metal server, and supplies the acquired information on the bare metal server and the hardware components (hereinafter also simply referred to as "bare metal server information") to the analysis unit 12.

More particularly, the server information acquisition unit 11 requests each of bare metal servers 3 to send information on the bare metal server concerned and the hardware components thereof, using, as a key, an identifier of a control board of the bare metal server 3, for example, an IP address, and receives the bare metal server information sent from the bare metal server 3 in response to the transmission request.

The Intelligent Platform Management Interface (IPMI) commands, the Redfish API, and the like, are interfaces that allow an external apparatus to obtain the hardware status of the respective bare metal servers 3 by remotely issuing commands. The server information acquisition unit 11 may remotely issue those IPMI commands, or the like, to the bare metal servers 3 and receive the response to the commands from respective bare metal servers 3.

The IPMI is capable of acquiring the status of each of bare metal servers 3 and the hardware components thereof through a single interface, regardless of the differences in or existence of the processor, the BIOS (Basic Input Output System), and the OS of the bare metal server 3. In addition, the IPMI is operable on the bare metal server 3 even when the bare metal server 3 is powered off.

The server information acquisition unit 11 may issue the IPMI commands to a large number of bare metal servers 3 deployed in a plurality of the accommodating stations 102 at once, or alternatively may issue the IPMI commands to one or a plurality of bare metal servers 3 individually. In addition, periodic issuance of the IPMI commands may be scheduled in advance and converted into tasks to be executed at the scheduled timing, and the tasks may be registered in the task folder 18. The server information acquisition unit 11 may also receive the bare metal server information sent from each of the bare metal servers 3 periodically or when a certain event occurs.

The analysis unit 12 analyzes the bare metal server information supplied from the server information acquisition unit 11 and supplies the analyzed bare metal server information to the structured file generation unit 13 and the diagnosis unit 14.

The structured file generation unit 13 generates a structured file from the analyzed bare metal server information supplied from the analysis unit 12 and stores the generated structured file in the structured file storage unit 17.

The structured file generated by the structured file generation unit 13 is a structured file that hierarchically stores, in a readable format, the bare metal server information, that is, information on the bare metal server and the hardware components thereof. More detailed structure of the structured file will be described later with reference to FIGS. 7 and 8.

The diagnosis unit 14 diagnoses the bare metal server 3 by referring to the analyzed bare metal server information supplied from the analysis unit 12.

More particularly, the diagnostic unit 14 generates a bare metal server status flag by referring to the information indicating the status of the bare metal server and the status of the hardware components included in the bare metal server information.

In other words, the diagnosis unit 14 determines whether or not any of the bare metal server and the hardware components thereof has an abnormality, and when it is determined that any of the bare metal server and the hardware components has an abnormality, sets the generated bare metal server status flag to ON. The bare metal server status flag generated by the diagnostic unit 14 is stored in the structured file of the bare metal server 3 concerned. The bare metal server status flag may be described in a header of the structured file.

The installation instructing unit 15 instructs the bare metal server 3 to install the OS and the virtualization software on the bare metal server 3.

More particularly, the installation instructing unit 15 reads out the structured file of each bare metal server 3 stored in the structured file storage unit 17, and, referring to the bare metal server status flag described in the structured file, extracts, from among all the bare metal servers that may be subject to the installation of the OS and the virtualization software, a bare metal server of which bare metal status flag is not set to ON, in other words, a bare metal server that is determined to have no abnormality. The installation instructing unit 15 sends, to one or a plurality of bare metal servers that are determined to have no abnormality, an instruction to install the OS and the virtualization software to the bare metal server concerned.

The input/output unit 16 provides an interface for instructing and inputting various commands and parameters, which operate the server management apparatus 1 or to be input to the bare metal server 3, to the server management apparatus 1. The input/output unit 16 also provides a Graphical User Interface (GUI) for displaying and outputting the execution results of the server diagnosis processing performed by the server management apparatus 1 via an output device such as a display device of an operation terminal 19 connected to the server management apparatus 1.

The input/output unit 16 is capable of reading out the structured file of the bare metal server 3 stored in the structured file storage unit 17, displaying the structured file on the display device of the operation terminal 19, and also allowing a user to edit the displayed structured file. The input/output unit 16 is yet also capable of allowing various tasks, which are stored in the task folder 18 and to be executed by a large number of bare metal servers 3 deployed in a plurality of accommodating stations 102, to be displayed on the display device of the operation terminal 19 so as to allow the user to register new tasks or edit the registered tasks.

The structured file storage unit 18 is constituted with a non-volatile storage device such as a Hard Disk Drive (HDD) or a Solid State Drive (SSD), and stores the structured file generated by the structured file generation unit 13. The structured file storage unit 18 may be an external storage device of the server management apparatus 1, or alternatively an internal storage device or a memory.

The task folder 18 stores various tasks to be executed by a large number of bare metal servers 3 deployed in a plurality of accommodating stations 102. Each of the tasks includes scripts describing a plurality of commands to be issued to the bare metal servers 3, and information such as schedules for executing the commands or scripts.

Figure 4:
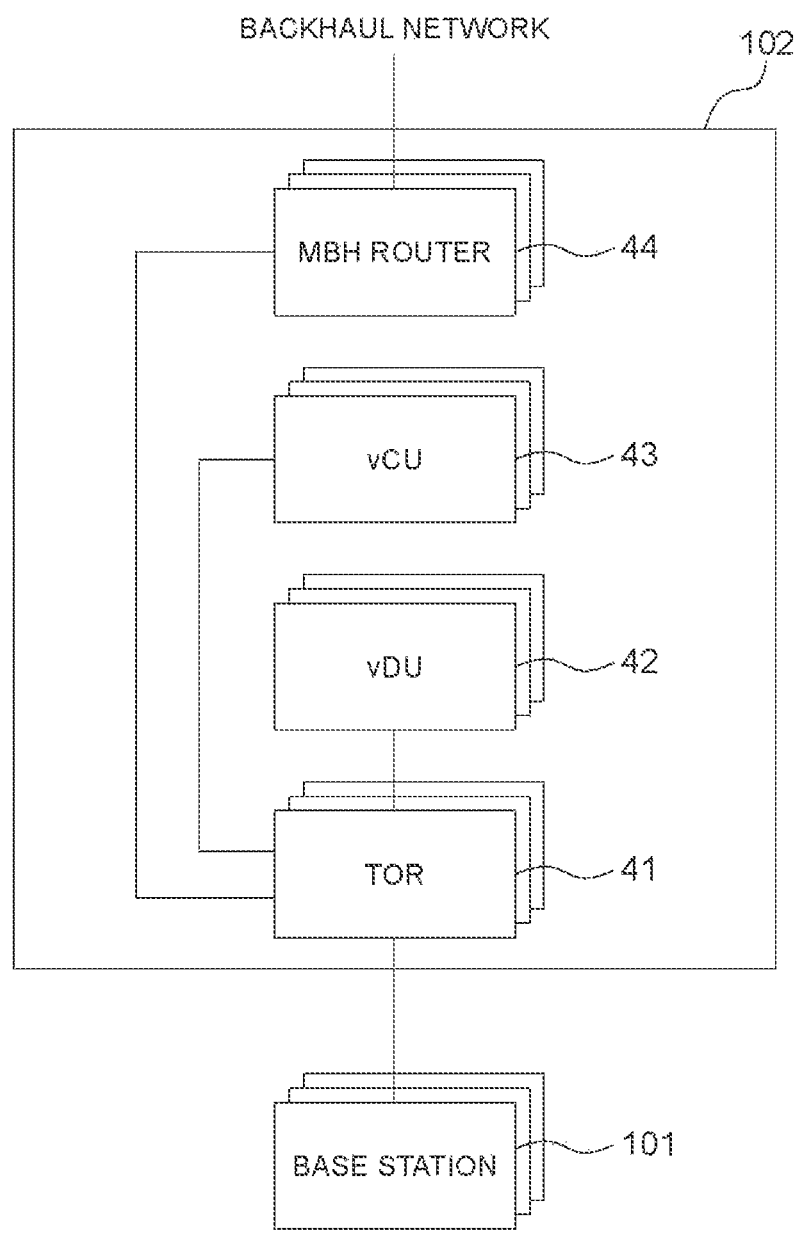
FIG. 4 is a block diagram illustrating an exemplary equipment configuration in an accommodating station constituting the mobile network system in FIG. 1.

FIG. 4 is a block diagram illustrating an exemplary equipment configuration in the accommodating station that constitutes the mobile network system in FIG. 1.

Referring to FIG. 4, the accommodating station 102 includes a Top of Rack (TOR) 41, a vDU42, a vCU43, and a Mobile Back-Haul (MBH) router 44.

The TOR 41 includes a rack, which houses the network equipment of the accommodating station 102, and switches. The TOR 41 accommodates respective network devices in the rack and provides wiring to the network devices accommodated in the rack. The TOR 41 also accommodates the fronthaul network from the base stations 101, which is constituted with fiber optic cables.

The vDU 42 is a virtualized radio signal processing unit, and the vCU 43 is a virtualized data processing unit. The vDU 42 and the vCU 43 may be implemented in one or a plurality of general-purpose servers, respectively.

The MBH router 44 connects the data center network of the accommodating station 102 to the core network via the backhaul network.

It should be noted that the configuration shown in FIG. 4 merely denotes the logical nodes of the network in the accommodating station 102, and does not necessarily correspond to the physical arrangement of switches, servers, and routers. Also, the number of the TOR 41, the vDU 42, the vCU 43, and the MBH routers 44 may be determined as appropriate depending on the number of the base stations 101 accommodated by the accommodating station 102, the functions borne by the virtualized network, the required throughput, or the like.

When a plurality of sets of the TOR 41, the vDU 42, the vCU 43, and the MBH routers 44 are installed, the network of the accommodating station 102 may be made redundant by splitting signals from the base station 101 and inputting the split signals to a plurality of TORs 41. In order to split the signals from the base station 101, for example, a splitter such as a Planar Lightwave Circuit (PLC) splitter may be used to split the signals from the base station 101.

The server management apparatus 1 according to the present embodiment performs the diagnosis processing of the bare metal servers, each of which is deployed in the accommodating station 102 and bears the functions of the vDU, vCU and the like shown in FIG. 4. The server management apparatus 1 may also perform the diagnosis processing of the bare metal servers, each of which is deployed in the RDC 103 and the CDC 104, similarly to the bare metal servers deployed in the accommodating station 102.

Figure 5:
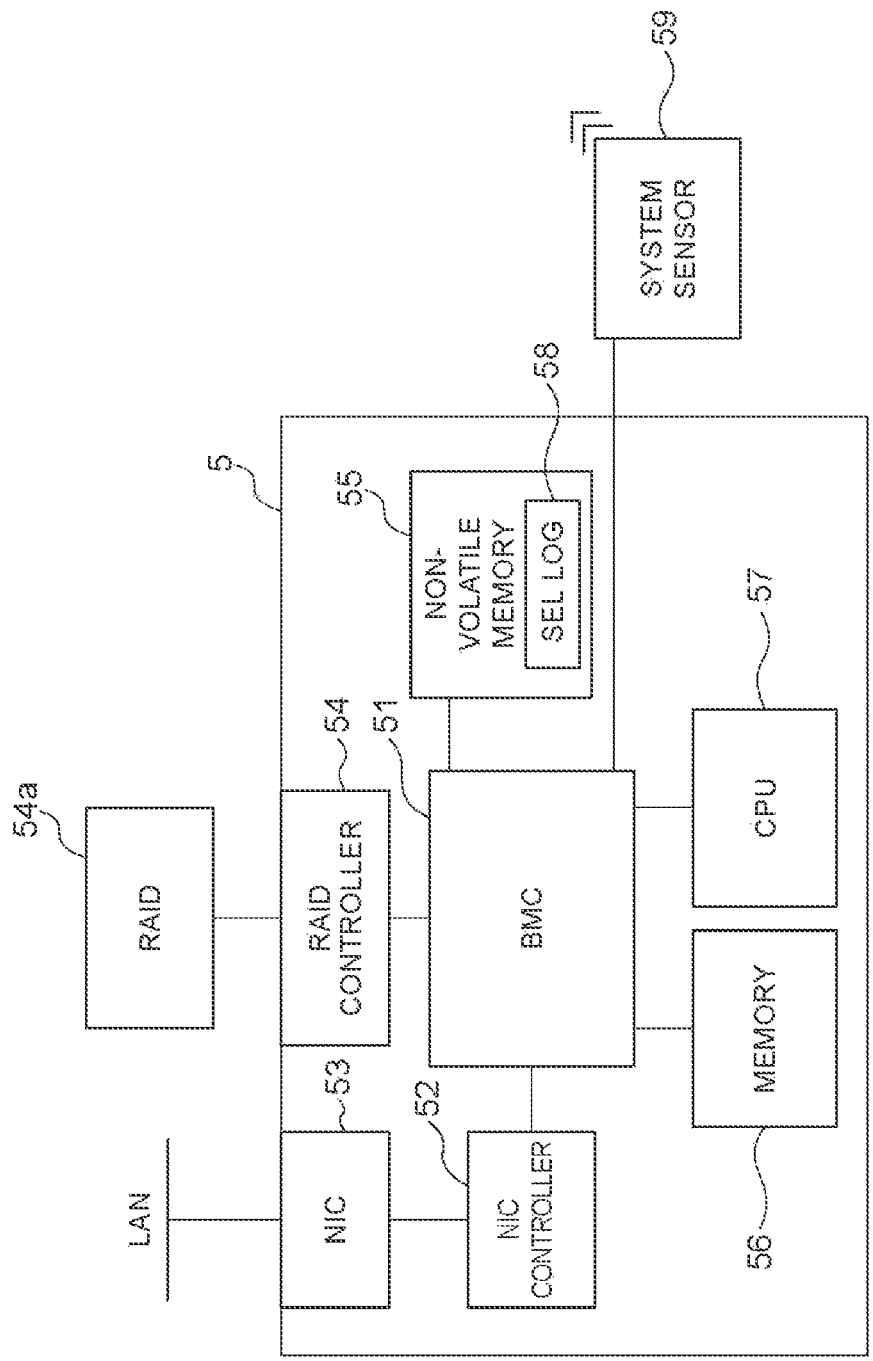
FIG. 5 is a block diagram illustrating a part of an exemplary hardware configuration of a bare metal server deployed in the accommodating station in FIG. 4, with a motherboard of the bare metal server being situated in a center.

FIG. 5 is a block diagram illustrating an exemplary hardware configuration of the bare metal server deployed in the accommodating station 102 in FIG. 4, with a motherboard of the bare metal server being situated in the center.

Referring to FIG. 5, a motherboard (i.e., control board) 5 of the bare metal server 3 may include a Baseboard Management Controller (BMC) 51, a Network Interface Card (NIC) Controller 52, a NIC 53, a Redundant Arrays of Inexpensive Disks (RAID) controller 54, a non-volatile memory 55, a main memory 56, and a Central Processing Unit (CPU) 57. The BMC 51 is connected to respective hardware components shown in FIG. 5 via a system bus.

The motherboard 5 is an electronic circuit control board that mounts the main components of a computer of the bare metal server. The motherboard 5 may also be equipped with various chipsets, expansion slots, and connectors for connecting power supplies and various disk drives.

The BMC 51 is constituted with a microprocessor and, using the IPMI (Intelligent Platform Management Interface), provides an interface for sending and receiving commands to external devices such as the server management apparatus 1.

The BMC 51 monitors each of the hardware components 52 to 59 shown in FIG. 5 and sends various information including the status of the bare metal server 3 and respective hardware components to the server management apparatus 1 in response to the IPMI commands from the server management apparatus 1 or autonomously. The BMC 51 also obtains an SEL log 56 of each of the hardware components and writes the SEL log 56 to the non-volatile memory 55.

The NIC controller 52 controls the operation of the NIC 53 that provides the interface to the Local Access Network (LAN) communication network.

The RAID controller 54 controls the operation of the RAID disks 54a that combines a plurality of HDDs to store data redundantly as one virtual HDD.

The non-volatile memory 55 is a non-volatile memory that is directly accessible by the BMC 51. The non-volatile memory 55 stores the SEL log 56 and information on a replaceable Field Replaceable Unit (FRU) of the motherboard 5, or the like.

The memory 56 is a volatile memory that operates as a main memory and a work area for the CPU 57.

The CPU 57 is a processor that comprehensively controls the operation of the server that mounts the motherboard 5.

The SEL log 58 is an event log recorded by the BMC 51. The BMC 51 monitors the status of the bare metal server 3 and each of the hardware components of the bare metal server 3, and records the obtained normal or abnormal status in the SEL log 58.

The IPMI command is capable of reading and clearing the SEL log 58, and also adding an event to the SEL log 58.

According to the present embodiment, the diagnosis unit 14 may set the bare metal server status flag by analyzing the SEL log included in the bare metal server information acquired by the server information acquisition unit 11.

The system sensor 59 detects the status of each of the hardware components of the bare metal server 3, such as sensors detecting the status of the power supply, fans, temperature sensors, or the like, and outputs the detected sensor signals to the BMC 51. The system sensor 59 may further include various control circuits such as power ON/OFF and reset.

According to the present embodiment, the server management apparatus 1 remotely issues the IPMI commands to the respective bare metal servers 3 using the IP address of the BMC 51 mounted on the motherboard 5 of the bare metal server 3 as the key. The BMC 51 of the bare metal server 3 receives the IPMI command and, in response to the received IPMI command, sends various information to the server management apparatus 1 indicating the identifier, version, status, and the like of the bare metal server 3 and respective hardware components thereof.

<Bare Metal Server Diagnosis Processing>

Figure 6:
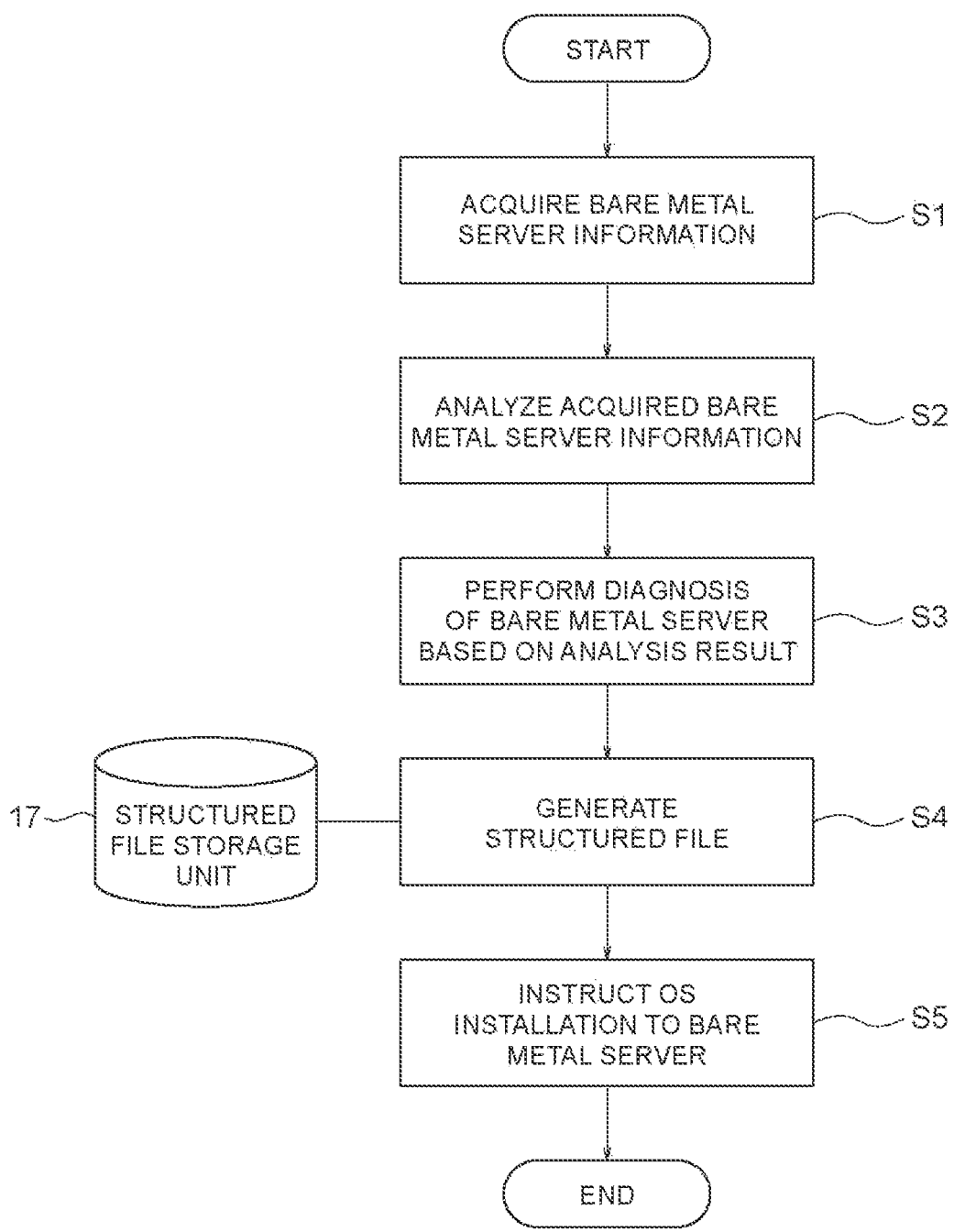
FIG. 6 is a flowchart illustrating an exemplary detailed processing procedure of bare metal server diagnosis processing performed by the server management apparatus according to the first embodiment.

FIG. 6 is a flowchart illustrating an exemplary detailed processing procedure of the bare metal server diagnosis processing performed by the server management apparatus according to the first embodiment.

The bare metal server diagnosis processing shown in FIG. 6 may be started when a command for status inquiry, such as an IPMI command, is issued to the bare metal server 3 in the accommodating station 102. This command issuance may be automatically executed by registering a task for executing a script containing a series of commands in the scheduler in the task folder 18 in advance, and reading the registered executable task by the server information acquisition unit 11 of the server management apparatus 1 to execute the read out executable task accordingly. Alternatively, the command issuance may be manually executed by an operator inputting the commands from a command line of the operation terminal 19 of the server management apparatus 1.

In step S1, the server information acquisition unit 11 of the server management apparatus 1 remotely issues the command for status inquiry, such as the IPMI command, to each of a large number of the bare metal servers 3 deployed in a plurality of accommodating stations 102 using the IP address of the BMC 51 as a key.

The BMC 51 of the motherboard 5 of the bare metal server 3 sends the information on the bare metal server 3 and the information on each of the hardware components to the server information acquisition unit 11 in response to the issued command. The server information acquisition unit 11 receives the bare metal server information sent from the BMC 51.

The bare metal server information received in step S1 may include information on the bare metal server 3, such as the IP address of the BMC 51, the serial number of the bare metal server 3, or the like. The bare metal server information received in step S1 may also include information on the hardware components of the bare metal server 3, such as the power ON/OFF status, the fan status and the temperature of the bare metal server 3, the firmware version of the BMC 51, the status of the NIC 53, the status of the RAID 54, the status and size of the memory 56 and the CPU 57, the drive allocation status and model, and the like. The bare metal server information received in step S1 may also include the SEL log 58.

In step S2, the analysis unit 12 of the server management apparatus 1 analyzes the bare metal server information acquired by the server information acquisition unit 11 in step S1, and supplies the analyzed bare metal server information (i.e., analysis results) to the structured file generation unit 13 and the diagnosis unit 14.

In step S3, the diagnosis unit 14 of the server management apparatus 1 performs the diagnosis of the bare metal server 3 based on the analysis results acquired in step S2.

More particularly, the diagnosis unit 14 generates the bare metal server status flag, and refers to the analyzed bare metal server information acquired in step S2 to determine whether or not there is any abnormality in the bare metal server 3 itself or in any of hardware components of the bare metal server 3. When any of the bare metal server 3 and the hardware components has an abnormality, the diagnosis unit 14 sets the bare metal server status flag to ON.

It should be noted that the bare metal server status flag is set to OFF when there is no abnormality in either the bare metal server 3 or any of the hardware components, in other words, when the bare metal server 3 is determined to be normal, and the initial value of the bare metal server status flag is OFF. When there is an abnormality in any of the bare metal server 3 and respective hardware components, the bare metal server status flag may allow a plurality of values to be set, which is capable of identifying a source component where the abnormality occurred and/or error codes.

In step S4, the structured file generation unit 13 of the server management apparatus 1 generates a structured file from the analyzed bare metal server information output from the analysis unit 12 in step S2 and the bare metal server status flag output from the diagnosis unit 14 in step S3, and stores the generated structured file in the structured file storage unit 17.

Figure 7:
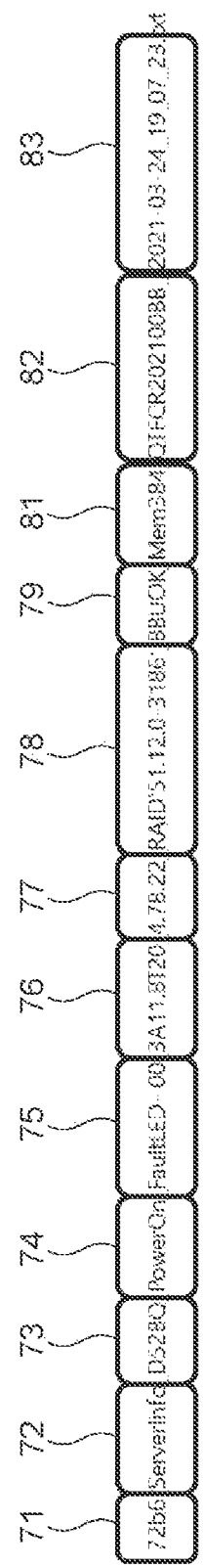
FIG. 7 is a schematic diagram illustrating an exemplary description of a header of a structured file generated by a structured file generation unit of the server management apparatus according to the present embodiments.

Referring to FIGS. 7 and 8, a non-limiting example of a format of the structured file generated by the structured file generation unit 13 in step S4 will be described in detail.

FIG. 7 is a schematic diagram illustrating an exemplary description of a header of the structured file generated by the structured file generation unit 13 of the server management apparatus 1 according to the present embodiment.

Referring to FIG. 7, the structured file is a file in a text format (.txt) as a readable format (i.e., human-readable format), and has the header shown in FIG. 7. Alternatively, the structured file generation unit 13 may use the character strings 71 to 82 shown in FIG. 7 as a file name of the generated structured file. Describing the character strings 71 to 82 shown in FIG. 7 as file names also falls within one embodiment of the header of the structured file.

The character string "72b6" denotes an identifier 71 that identifies the bare metal server 3, and in the example of FIG. 7, a part of the IP address of the BMC 51 of the bare metal server 3 is described. The identifier 71 of the BMC 51 of the bare metal server 3 may be a key of the structured file. The identifier 71 may describe, for example, all or a part of the IP address or the MAC address of the BMC 51.

The character string "ServerInfo" denotes an information type 72 that the structured file describes, and in the example of FIG. 7, it indicates information on a server.

The character string "D52BQ" denotes the vendor's model name 73 of the bare metal server 3.

The character string "PowerOn" denotes the power status of the bare metal server 3, and in the example of FIG. 7, it indicates that the power is on.

The character string "FaultLED-00" is the bare metal server status flag 75 that indicates whether the bare metal server 3 has an abnormality or is normal, and in the example of FIG. 7, the value of "00" indicates that the bare metal server 3 has no abnormality, in other words, the bare metal server 3 is normal.

The character string "3A11.BT20" denotes the BIOS version 76 of the bare metal server 3. The character string "4.78.22" denotes the version 77 of the BMC 51.

The character string "RAID '51.12.0-3186'. 0-3186'" denotes the version 78 of the RAID card (controller) 54.

The character string "BBUOK" denotes the backup battery status 79 of the RAID 54*a*, and in the example of FIG. 7, it indicates that the BBU is in a normal state.

The character string "Mem384" denotes the size 81 of the memory 56, and in the example in FIG. 7, it indicates that the memory size is 384 GB.

The character string "QTFCR202100BB" denotes the serial number 82 of the bare metal server 3.

The character string "2021-03-24_19_07_23" denotes the time stamp 83 at which the various data of 71 to 82 were obtained.

According to the present embodiment, as shown in FIG. 7, the structured file generation unit 13 generates the header of the structured file by adding a plurality of values of the bare metal server information of the bare metal server 3. The structured file generation unit 13 generates the header of the structured file such that the header includes the bare metal server status flag 75 in the structured file.

The structured file generation unit 13 may generate the header, from among the bare metal server information, mainly from the identification information, the version information, and the status information of the bare metal server 3 itself.

The header layout shown in FIG. 7 is no more than an example, and the structured file generation unit 13 may describe all or a part of the hardware component information in the header from among the bare metal server information acquired in step S2. Also, the structured file generation unit 13 may generate the header of the structured file from a subset of the bare metal server information and hardware component information acquired in step S2.

FIG. 8 is a schematic diagram illustrating an exemplary bare metal server information described in the body of the structured file in FIG. 7.

Referring to FIG. 8, the structured file 80 describes, in the order from top to bottom, the BMC IP address ("BMC IP"), the bare metal server status flag ("FaultLED"), the server serial number, the power ON/OFF status, the firmware version of the BMC51, the BIOS version, and the memory size. Those descriptions are shared in common with the descriptions in the header shown in FIG. 7.

Furthermore, the structured file 80 also includes the status of the memory 56, the status and size of the PCIE card, which is an expansion card inserted into a slot on the motherboard 5, the BIOS configuration attributes, the status and the memory size of the RAID controller 54, the status and the capacity of each drive, the detailed status of the BBU, the status of the power supply unit, the SEL log 58, and values detected by various system sensors 59.

Those values are mainly information about the hardware components of the bare metal server 3, such as their identifiers, the capacities, and statuses, which are not described in the header shown in FIG. 7.

As described above, according to the present embodiment, the structured file generation unit 13 describes, in the header of the structured file, the identifier, the version and the status of the bare metal server 3 itself, those of which are the major bare metal server information from among the bare metal server information acquired in step S2. In addition, the structured file generation unit 13 describes, in the body of the structured file, the information of the hardware components of the bare metal server 3 and the detailed information of the information of the bare metal server 3 itself described in the header from among the bare metal server information acquired in step S2. In this way, according to the present embodiment, the bare metal server information is hierarchically stored in the header and the body of the structured file so as to generate a structured file in which the bare metal server information is stored in a structured manner.

Therefore, an operator who monitors a large number of bare metal servers 3 via the operation terminal 19 can browse a large number of structured files stored in the structured file storage unit 17 in a list format, or the like, and can easily and visually recognize the status of each bare metal server 3 from the character strings described in the header or the file name of the structured file.

For example, in response to a request input by the operator via an operation terminal 19, it makes it possible to perform the display control to sort, from among a plurality of columns 71 to 83 of the header in a large number of structured files, one or a plurality of columns of the header specified in the input request to output the sorted columns on the display device. The header of the structured file has columns that contain values indicating the status of the bare metal server 3 and the hardware components. As a result, it makes it possible to easily perform the diagnosis of a large number of bare metal servers 3 by simply sorting a part of columns of the header of the structured file.

In addition, it makes it possible to provide a generic tool that extracts items of the bare metal server status flag 75 and other desired bare metal information from character strings described in the header or the file name of the structured file, and sorts the extracted items, regardless of the difference in the vendors, the server models, the installed OS, BIOS, or the like.

The server management apparatus 1 may also periodically collect the bare metal server information from all of the bare metal servers 3 connected to the server management apparatus 1 via the server information acquisition unit 11, for example, at regular intervals every day, and automatically perform diagnosis of all bare metal servers 3 based on the collected bare metal server information.

More particularly, the diagnosis unit 14 of the server management apparatus 1 extracts the bare metal servers 3 that have the values of the bare metal server status flag (FaultLED) is other than "00" among all of the bare metal servers 3. Furthermore, the diagnostic unit 14 may add the information on the source of the abnormality, which indicates which hardware component has caused the abnormality, to the analysis results by the analysis unit 12 for the extracted bare metal servers 3, and output them to the display device of the operation terminal 19 or the like.

The operator can visually recognize the information on the source of the abnormality, which indicates which hardware component has caused the abnormality, which is output to the operation terminal 19, and appropriately and easily determine the operational commands to be issued, such as a power cycle (power OFF/ON), disable/enable a given setting, a firmware upgrade/downgrade, or the like, to the bare metal server 3 that indicates the abnormality.

It should be noted that the formats of the structured file shown in FIGS. 7 and 8 is no more than exemplary, and the present embodiment is not limited thereto. For example, the contents of the file shown in FIG. 8, that is, the details of the bare metal server information and the hardware component information, may be described in a non-human-readable format such as binary codes, as long as the file name or the header of the structured file is described in human-readable strings.

Furthermore, the header of the structured file shown in FIG. 7 may also include the identifiers of the accommodating station 102 where the bare metal server 3 is deployed and the corresponding data centers 103 and 104 thereto.

Returning back to FIG. 6, in step S5, the installation instructing unit 15 of the server management apparatus 1 reads out the structured files stored in the structured file storage unit 17 and extracts the bare metal server 3 of which bare metal server status flag 75 is not set to ON. The installation instructing unit 15 sends an instruction to install the OS and the virtualization software to the extracted bare metal servers 3, in other words, normal bare metal servers 3 that satisfy the conditions to install the OS and the virtualization software, respectively.

It is also possible to automatically execute the transmission of the instruction of the OS installation to a plurality of bare metal servers 3 at once. For example, the command to execute the installation can be written in a script in advance, and the script execution task can be registered in the task folder 18 to be started at a predetermined schedule. Thus, it makes it possible to automatically execute the task with the list of the bare metal servers 3 extracted in step S5 as a parameter.

As described above, according to the present embodiment, the server management apparatus acquires information on each of bare metal servers and information on hardware components included in the bare metal server from a plurality of bare metal servers deployed in a plurality of accommodating stations, respectively, using the identifier of a control board of the bare metal server as a key, analyzes the acquired information, and generates a bare metal server status flag from the information of the bare metal server and the hardware components.

Furthermore, the server management apparatus further generates a structured file in a readable format that stores the acquired bare metal server information and hardware component information in a hierarchical manner, and describes the generated bare metal server status flag in a header of the structured file.

This allows servers to be deployed expeditiously with higher accuracy in a large-scale network constructed on the virtualization infrastructure. In particular, the information on bare metal servers, hardware components, and status flags indicating whether or not any of the bare metal server and the hardware components thereof has abnormality are stored in the structured file in a readable format. Therefore, it makes it possible to easily and arbitrarily extract and process the information necessary for diagnosis and deployment of a large number of bare metal servers even in a multi-vendor environment. As a result, it makes it possible to contribute to the efficiency and automation of the construction and operation of the network virtualization infrastructure.

Second Embodiment

Hereinafter, referring now to FIGS. 9 and 10, the server management apparatus according to a second embodiment will be described in detail solely with respect to aspects that differ from those of the first embodiment above.

The present embodiment determines whether or not the firmware needs to be updated before installing the OS or the virtualization software on the bare metal server deployed in the accommodating station, and describes information indicating whether or not the firmware needs to be updated in the header of the structured file.

In order to construct network virtualization infrastructures in a plurality of accommodating stations 102, respectively, it is required to update the firmware of the bare metal servers as necessary, and to install the OS and the virtualization software on the bare metal servers with the appropriately updated firmware. The present embodiment describes, in the header of the structured file, information indicating whether or not the firmware update is required for each of a large number of bare metal servers deployed in a plurality of accommodating stations, thereby enabling the unified or centralized management of the firmware update.

Figure 9:
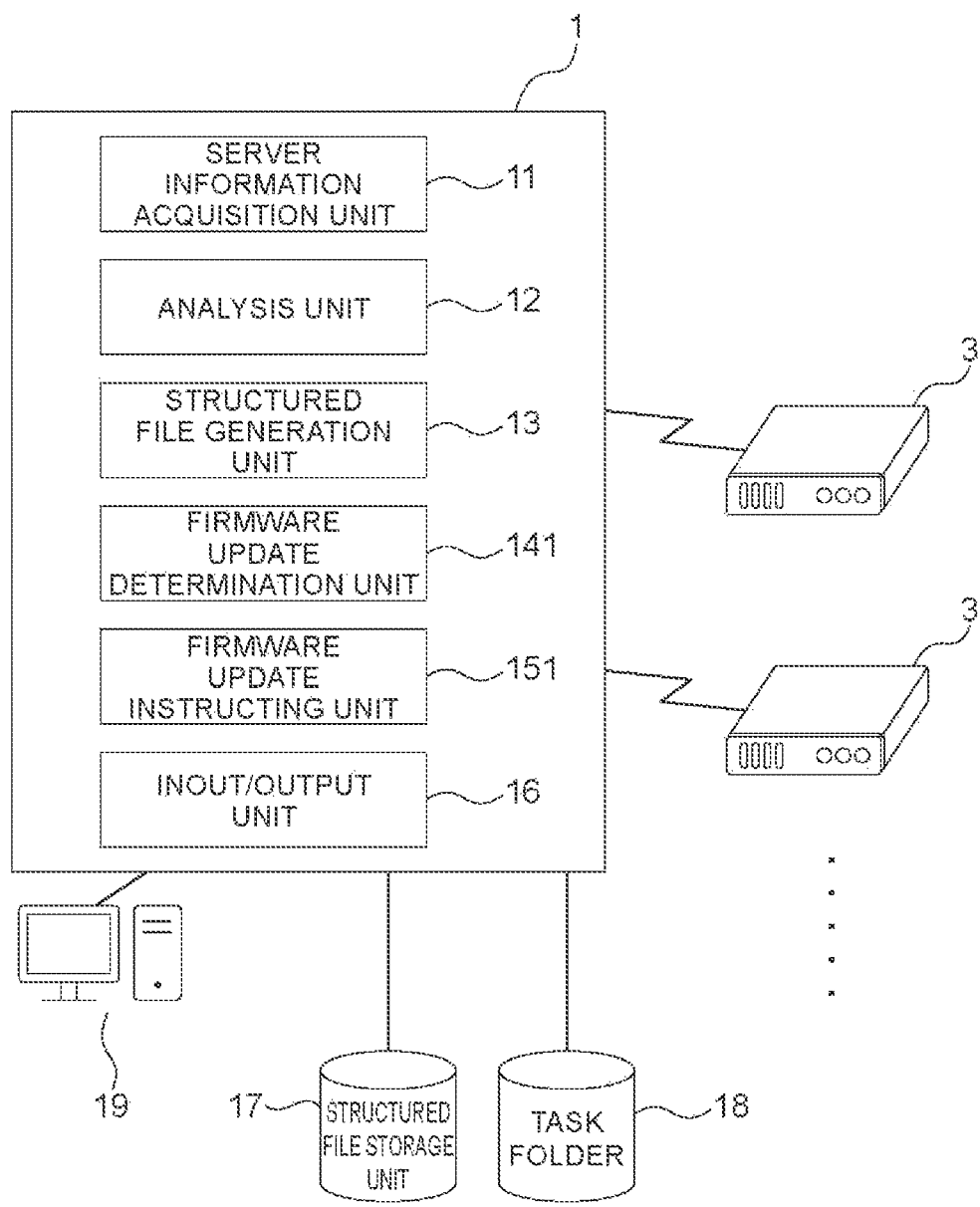
FIG. 9 is a block diagram illustrating an exemplary functional configuration of the server management apparatus according to a second embodiment.

FIG. 9 is a block diagram illustrating an exemplary functional configuration of the server management apparatus 1 according to the second embodiment.

Referring to FIG. 9, the server management apparatus 1 includes a server information acquisition unit 11, an analysis unit 12, a structured file generation unit 13, a firmware update determination unit 141, a firmware update instructing unit 151, an input/output unit 16, a structured file storage unit 17, and a task folder 18.

The server information acquisition unit 11, the analysis unit 12, the structured file generation unit 13, the input/output unit 16, the structured file storage unit 17, and the task folder 18 of the server management apparatus 1 are similar to those of the above first embodiment shown in FIG. 3.

According to the present embodiment, the firmware update determination unit 141 refers to the analyzed bare metal server information supplied from the analysis unit 12 to determine whether or not to update the firmware of the bare metal server 3 concerned.

More particularly, the firmware update determination unit 141 refers to the information indicating the firmware version of the bare metal server included in the bare metal server information to determine whether or not the firmware version described in the bare metal server information satisfies the prerequisites for the OS to be installed, and generates a firmware update flag indicating whether or not the firmware of the bare metal server 3 needs to be updated.

In other words, the firmware update determination unit 141 sets the generated firmware update flag to ON when the firmware of the bare metal server 3 is determined to be updated. The firmware update flag generated by the firmware update determination unit 141 is stored in the structured file of the bare metal server 3 concerned. This firmware update flag may be described in the header of the structured file.

The firmware update determination unit 141 may also refers to the information on the hardware components included in the bare metal server information to determine whether or not to update the firmware of any of the hardware components of the bare metal server 3.

In this case, the firmware update determination unit 141 determines whether or not the firmware version of each of the hardware components of the bare metal server 3 satisfies the prerequisites of the OS to be installed, and when it is determined that the firmware of any of the hardware components needs to be updated, the firmware update determination unit 141 may generate a second firmware update flag indicating whether or not the firmware of the hardware component concerned needs to be updated. Alternatively, the firmware update determination unit 141 may, instead of generating the second firmware update flag, add a value indicating the firmware update of the hardware component concerned to a part of the firmware update flag of the bare metal server 3.

The firmware update instructing unit 151 instructs the bare metal server 3 to update the firmware prior to the installation of the OS and the virtualization software on the bare metal server 3. Subsequent to instructing the firmware update, the firmware update instructing unit 151 may further instruct the bare metal server to install the OS and the virtualization software on the bare metal server 3.

More particularly, the firmware update instructing unit 151 reads out the structured files of respective bare metal servers 3 stored in the structured file storage unit 17, refers to the firmware update flag described in the structured file, and extracts the bare metal server of which firmware update flag is set to ON, in other words, the bare metal server for which the firmware is required to be updated. The firmware update instructing unit 151 sends an instruction to each of the extracted bare metal servers, of which firmware is determined to be required to be updated, to update the firmware prior to the installation of the OS and the virtualization software. Here, the term "firmware update" includes both a normal update and an upgrade with functional enhancements.

Figure 10:
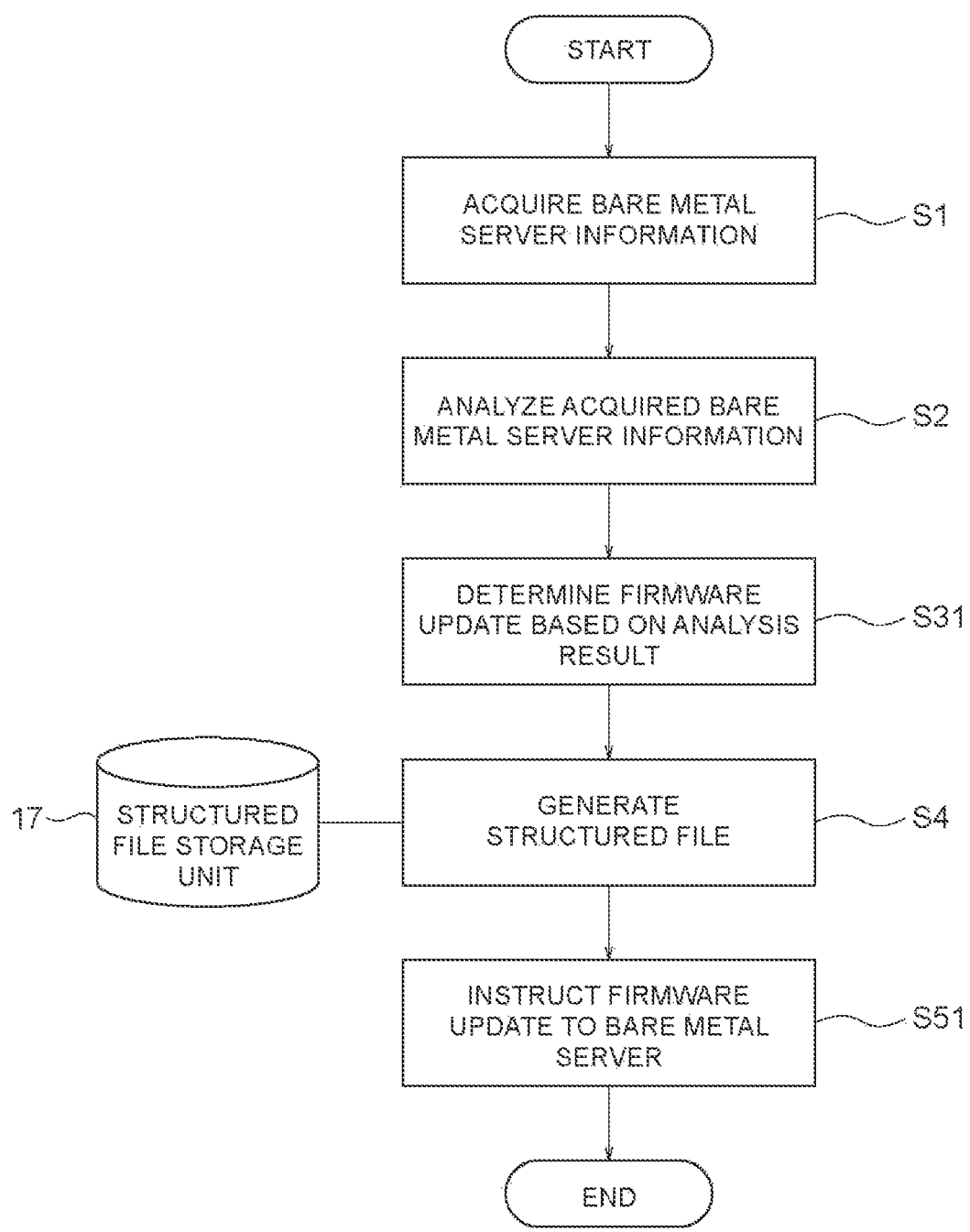
FIG. 10 is a flowchart illustrating an exemplary detailed processing procedure of firmware update processing performed by the server management apparatus according to the second embodiment.

FIG. 10 is a flowchart illustrating an exemplary detailed processing procedure of the firmware update processing of the bare metal server performed by the server management apparatus according to the second embodiment.

Referring to FIG. 10, steps S1 and S2 are similar to the steps S1 and S2 of the first embodiment shown in FIG. 6.

Subsequent to step S2, in step S31, the firmware update determination unit 14 of the server management apparatus 141 determines whether or not the firmware of the bare metal server 3 needs to be updated based on the analysis results acquired in step S2. More particularly, the firmware update determination unit 141 generates the firmware update flag, refers to the analyzed bare metal server information acquired in step S2 to determine whether or not the firmware of the bare metal server 3 needs to be updated, and when it is determined that the firmware needs to be updated, set the firmware update flag to ON.

It should be noted that the firmware update flag is set to OFF when the firmware of the bare metal server 3 does not need to be updated, and the initial value of the firmware update flag is OFF. When any firmware of any of the bare metal server 3 and respective hardware components needs to be updated, the firmware update status flag may allow a plurality of values to be set, which is capable of identifying the component where the firmware update is required.

Referring to FIG. 7, the header of the structured file may include the firmware update flag instead of or in addition to the firmware version 77 of the BMC 51 of the bare metal server 3. The firmware version 77 included by the header of the structured file is also one embodiment of the information that indicates whether or not the firmware needs to be updated.

Returning back to FIG. 10, step S4 is similar to step S4 of the first embodiment shown in FIG. 6.

Subsequent to step S4, in step S51, the firmware update instructing unit 151 of the server management apparatus 1 reads out the structured file stored in the structured file storage unit 17 and extracts the bare metal server 3 of which firmware update flag is set to ON. The firmware update instructing unit 151 sends an instruction to update the firmware to the extracted bare metal server 3, in other words, the bare metal server 3 for which the firmware is to be updated, prior to the installation of the OS and the virtualization software.

It is also possible to automatically execute sending of the firmware update instructions to a plurality of bare metal servers 3 at once. For example, the commands to execute the firmware update is described in a script in advance, and the script execution task is registered in the task folder 18 to be started on a predetermined schedule. Thus, the task can be automatically executed with the list of the bare metal servers 3 extracted in step S51 as a parameter.

As described above, according to the present embodiment, the server management apparatus acquires information on the bare metal server and hardware components included in the bare metal server concerned from a plurality of bare metal servers deployed in a plurality of accommodating stations, using the identifier of the control board of the bare metal server as the key. The server management apparatus further analyzes the acquired information to generate a firmware update flag.

The server management apparatus yet further generates a structured file in a readable format that hierarchically stores the acquired bare metal server information and hardware component information, which includes a header describing the generated firmware update flag.

Therefore, it makes it possible to update the firmware in the servers expeditiously with higher accuracy in a large-scale network constituted by the virtualization infrastructure. In particular, since the structured file according to the present embodiment stores the information on bare metal servers, hardware components, and the firmware update flag indicating whether or not the firmware needs to be updated in a readable format, it makes it possible to easily and arbitrarily extract and process the information necessary to update and deploy the firmware of a large number of bare metal servers even in a multi-vendor environment. As a result, it makes it possible to contribute to the efficiency and automation of the construction and operation of the network virtualization infrastructure.

<Hardware Configuration of Server Management Apparatus>

Figure 11:
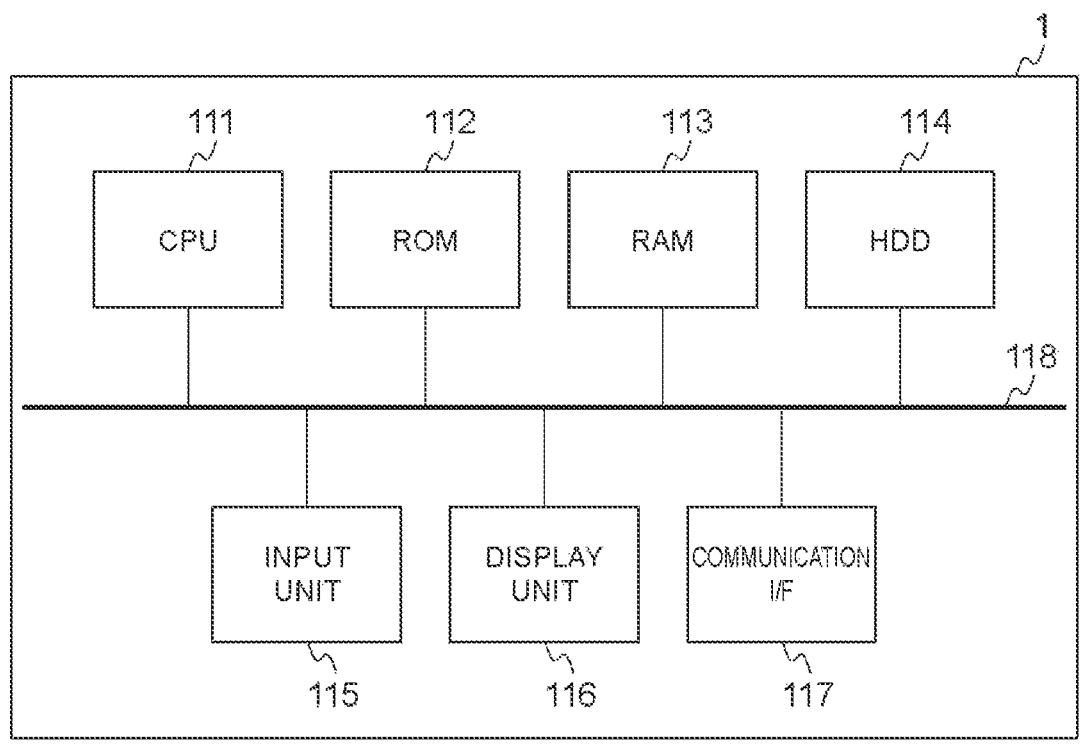
FIG. 11 is a block diagram showing an exemplary hardware configuration of the server management apparatus according to the embodiments of the present invention.

FIG. 11 is a block diagram illustrating a non-limiting example of the hardware configuration of the server management apparatus 1 according to the present embodiment.

The server management apparatus 1 according to the present embodiment may be implemented in any single or a plurality of computers or any other processing platform. The server management apparatus 1 may be implemented in a general-purpose server device that constitutes a cloud, or otherwise in a dedicated server device.

Referring to FIG. 11, although an example of the server management apparatus 1 being implemented in a single computer is shown, alternatively, the server management apparatus 1 according to the present embodiment may be implemented in a computer system including a plurality of computers. The plurality of computers may be intercommunicatively connected by a wired or wireless network.

As shown in FIG. 11, the server management apparatus 1 may include a CPU 111, a ROM 112, a RAM 113, an HDD 114, an input unit 115, a display unit 116, a communication I/F 117, and a system bus 118. The server management apparatus 1 may also be equipped with an external memory.

The CPU (Central Processing Unit) 111 controls entire operations of the server management apparatus 1 in a comprehensive manner, and controls the operations of respective components 112 to 117 via the system bus 118, which serves as a data transmission path.

The ROM (Read Only Memory) 112 is a non-volatile memory that stores the control programs and the like necessary for the CPU 111 to execute the processing.

Those programs may be stored in a non-volatile memory such as an HDD (Hard Disk Drive) 114, an SSD (Solid State Drive), or removable storage media (not shown).

The RAM (Random Access Memory) 113 is a volatile memory and functions as a main memory, a work area, or the like of the CPU 111. In other words, the CPU 111 loads the necessary programs and the like from the ROM 112 into the RAM 113 and executes the programs to realize various functional operations.

The HDD 114 stores, for example, various data and information necessary for the CPU 111 to perform processing using the programs. In addition, the HDD 114 stores, for example, various data and various information and the like obtained by the CPU 111 performing the processing using the programs and the like.

The input unit 115 is constituted with a pointing device such as a keyboard or a mouse.

The display unit 116 is constituted with a monitor such as a liquid crystal display (LCD). The display unit 116 may provide a GUI (Graphical User Interface) that is used to input instructions to the server management apparatus 1 for various parameters used in the bare metal server diagnosis processing, communication parameters used in communication with other devices, or the like.

The communication I/F 117 is an interface that controls communication between the server management apparatus 1 and external devices.

The functions of at least some of the components of the server management apparatus 1 shown in FIGS. 3 and 9 may be realized by the CPU 111 executing the programs. However, at least some of the functions of the components of the server management apparatus 1 shown in FIGS. 3 and 9 may be operated by a dedicated hardware. In this case, the dedicated hardware operates based on the control of the CPU 111.

Although certain embodiments have been described above, the embodiments described are merely illustrative and are not intended to limit the scope of the present invention. The apparatus and methods described herein may be embodied in other forms than those described above. In addition, without departing from the scope of the present invention, omissions, substitutions, and modifications may be made to the above embodiments as appropriate. Such omissions, substitutions, and modifications fall within the scope of the appended claims and equivalents thereof, and fall within the technical scope of the present invention.

REFERENCE SIGNS LIST

1: Server Management Apparatus; 3: Bare Metal Server; 5: Motherboard; 11: Server Information Acquisition Unit; 12: Analysis Unit; 13: Structured File Generation Unit; 14: Diagnosis Unit; 15: Installation Instructing Unit; 16: Input/Output Unit; 17: Structured File Storage Unit; 18: Task Folder; 19: Operation Terminal; 21: NFVI; 22: VNF; 23: MANO; 24: OSS/BSS; 41: TOR; 42: vDU; 43: vCU; 44: MBH Router; 51: BMC; 52: NIC Controller; 53: NIC; 54: RAID Controller; 54*a*: RAID; 55: Non-volatile Memory; 56: Memory; 57: CPU; 58: SEL Log; 59: System Sensor; 80; Structured File; 100: Mobile Network; 101: Base Station; 102: Accommodating Station; 103: RDC; 104: CDC; 105: Internet; 111: CPU; 112: ROM, 113: RAM, 114: HDD; 115: Input Unit; 116: Display Unit; 117: Communication I/F; 118: System Bus; 141: Firmware Update Determination Unit; 15: Firmware Update Instructing Unit

What is claimed is:

1. A server management apparatus, comprising:
   at least one memory configured to store program code; and
   electronic circuitry including at least one of a field programmable gate array (FPGA), an application specific integrated circuit (ASIC), and at least one processor, the at least one processor being configured to read and operate according to the program code, the electronic circuitry configured to:
   acquire, from a plurality of servers respectively, server information on a server and hardware component information on hardware components included in the server, using an identifier of a control board of the server as a key;
   analyze the server information and the hardware component information, and acquire information indicating whether or not firmware of any of the server and the hardware components needs to be updated; and
   generate a structured file that hierarchically stores, in a readable format, the server information and the hardware component information, the structured file including a header describing the information indicating whether or not the firmware of any of the server and the hardware components needs to be updated,
   wherein the server information and the hardware component information each comprises major information and detailed information, the major information being stored in the header of the structured file and the detailed information being stored in a body of the structured file, and
   wherein the server information and the hardware component information include an identifier, a version, and a status of the server.

2. The server management apparatus according to claim 1, wherein
   generating the structured file describes the header as a file name of the structured file.

3. The server management apparatus according to claim 1, wherein
   generating the structured file sets the identifier of the control board to the structured file as a key of the structured file.

4. The server management apparatus according to claim 1, wherein
   generating the structured file describes at least a part of the server information in the header of the structured file, and describes at least a part of the hardware component information in the body of the structured file.

5. The server management apparatus according to claim 1, wherein
   generating the structured file describes, in the header of the structured file, a timestamp when the server information and the hardware component information are acquired.

6. The server management apparatus according to claim 1, wherein
   the identifier of the control board used as the key is an IP address of the control board.

7. The server management apparatus according to claim 1, wherein the electronic circuitry is further configured to:
   extract a server of which the firmware needs to be updated based on the information indicating whether or not the firmware of any of the server and the hardware components needs to be updated, and instruct to update the firmware to the extracted server.

8. The server management apparatus according to claim 7, wherein
   instructing the firmware update acquires a server status flag indicating whether or not any of the server and the hardware components has an abnormality, and instruct to update the firmware to the server of which server status flag indicates no abnormality.

9. The server management apparatus according to claim 8, wherein the electronic circuitry is further configured to:
   periodically acquire the server information and the hardware component information for the servers connected to the server management apparatus, extract a server of which server status flag indicates abnormality from among the servers, and add information indicating which hardware component is a source of abnormality to an analysis result of the extracted server to externally output the analysis result.

10. The server management apparatus according to claim 1, further comprising:
    a storage configured to store the structured file.

11. The server management apparatus according to claim 1, wherein the electronic circuitry further is configured to:
    sort, in response to an input request, one or plurality of columns specified by the input request from among a plurality of columns of the header of the structured file, and cause a display device to output the one or a plurality of sorted columns.

12. A server management method performed by a server management apparatus, comprising steps of:
    acquiring, from a plurality of servers respectively, server information on a server and hardware component information on hardware components included in the server, using an identifier of a control board of the server as a key;
    analyzing the server information and the hardware component information, and acquiring information indicating whether or not firmware of any of the server and the hardware components needs to be updated; and
    generating a structured file that hierarchically stores, in a readable format, the server information and the hardware component information, the structured file including a header describing the information indicating whether or not the firmware of any of the server and the hardware components needs to be updated,
    wherein the server information and the hardware component information each comprises major information and detailed information, the major information being stored in the header of the structured file and the detailed information being stored in a body of the structured file, and wherein the server information and the hardware component information include an identifier, a version, and a status of the server.

13. A non-transitory computer-readable recording medium having recorded thereon a server management computer program product executable by a computer for causing the computer to execute server management processing, the computer program product causing the computer to execute processing comprising:
- a server information acquisition process for acquiring, from a plurality of servers respectively, server information on a server and hardware component information on hardware components included in the server, using an identifier of a control board of the server as a key;
- an analysis process for analyzing the server information and the hardware component information acquired by the server information acquisition process, and acquiring information indicating whether or not firmware of any of the server and the hardware components needs to be updated; and
- a structured file generation process for generating a structured file that hierarchically stores, in a readable format, the server information and the hardware component information acquired by the server information acquisition process, the structured file including a header describing the information indicating whether or not the firmware of any of the server and the hardware components needs to be updated acquired by the analysis process, wherein the server information and the hardware component information each comprises major information and detailed information, the major information being stored in the header of the structured file and the detailed information being stored in a body of the structured file, and wherein the server information and the hardware component information include an identifier, a version, and a status of the server.

* * * * *